United States Patent
Marschall et al.

(10) Patent No.: US 9,263,927 B2
(45) Date of Patent: Feb. 16, 2016

(54) STATOR OF AN ELECTRICAL MACHINE

(75) Inventors: Peter Marschall, Schwieberdingen (DE); Klaus Lindner, Neckarwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 320 days.

(21) Appl. No.: 13/880,699

(22) PCT Filed: Aug. 26, 2011

(86) PCT No.: PCT/EP2011/064712
§ 371 (c)(1),
(2), (4) Date: Aug. 16, 2013

(87) PCT Pub. No.: WO2012/052208
PCT Pub. Date: Apr. 26, 2012

(65) Prior Publication Data
US 2013/0320817 A1 Dec. 5, 2013

(30) Foreign Application Priority Data
Oct. 21, 2010 (DE) .......................... 10 2010 042 751
Dec. 20, 2010 (DE) .......................... 10 2010 063 581

(51) Int. Cl.
*H02K 11/00* (2006.01)
(52) U.S. Cl.
CPC ................................. *H02K 11/0047* (2013.01)
(58) Field of Classification Search
CPC .................................................. H02K 11/0047
See application file for complete search history.

(56) References Cited

U.S. PATENT DOCUMENTS

| | | | | |
|---|---|---|---|---|
| 4,188,553 A | * | 2/1980 | Wheaton | 310/68 C |
| 4,313,069 A | | 1/1982 | Szabo et al. | |
| 4,328,438 A | | 5/1982 | Zolman | |
| 4,926,077 A | * | 5/1990 | Gauthier et al. | 310/68 C |
| 6,153,954 A | * | 11/2000 | Uchida et al. | 310/68 C |
| 7,402,925 B2 | * | 7/2008 | Best et al. | 310/68 C |
| 2007/0194654 A1 | * | 8/2007 | Rush et al. | 310/260 |
| 2008/0297011 A1 | | 12/2008 | Delaney et al. | |

FOREIGN PATENT DOCUMENTS

| | | |
|---|---|---|
| DE | 39 29 718 | 4/1990 |
| DE | 196 06 141 | 8/1997 |
| DE | 197 06 424 | 8/1998 |
| EP | 1 278 291 | 1/2003 |
| EP | 1 294 079 | 3/2003 |
| EP | 1 322 026 | 6/2003 |
| EP | 2 066 008 | 6/2009 |
| JP | 63 249445 | 10/1988 |
| JP | 2003 092858 | 3/2003 |

OTHER PUBLICATIONS

International Search Report of PCT/EP2011/064712 dated Jan. 9, 2012.

* cited by examiner

*Primary Examiner* — Dang Le
(74) *Attorney, Agent, or Firm* — Kenyon & Kenyon LLP

(57) ABSTRACT

A stator of an electrical machine provides a sensor carrier having a spring element that presses the sensor element against one of the coils.

3 Claims, 4 Drawing Sheets

STATOR OF AN ELECTRICAL MACHINE

FIELD OF THE INVENTION

The present invention relates to a stator of an electrical machine.

BACKGROUND INFORMATION

A stator of an electrical machine is discussed in European Patent Application EP 2 066 008 A1 that has electrical coils and a temperature sensor for recording the temperature at one of the electrical coils, the temperature sensor being provided in the area between two coils on a sensor carrier, and including a sensor element and at least one sensor cable that is connected to the sensor element. It is disadvantageous, however, that the sensor element of the temperature sensor does not make reliable contact with the coils. Consequently, it is not certain that the highest temperature of the coil is being measured, so that, by the time the electrical machine is stepped down to lower power levels in response to an overheating, it could be too late. Therefore, the temperature measurement is not reliable.

Thus, stators of an electrical machine are understood that have electrical coils and a temperature sensor for recording the temperature at one of the electrical coils, the temperature sensor being provided in the area between two coils on a sensor carrier and having a sensor element and at least one sensor cable that is connected to the sensor element. It is disadvantageous that the sensor element of the temperature sensor does not make reliable contact with the coils. Consequently, it is not certain that it is the temperature of the coil that is measured. Rather, in certain circumstances, it is the temperature in the gap between the coils that is measured. Therefore, the temperature measurement is not reliable.

SUMMARY OF THE INVENTION

Against this background, it is an advantage of the inventive stator of an electrical machine having the characterizing features of the main claim that the sensor element is reliably contacted by one of the coils in that the sensor carrier has a spring element that presses the sensor element against one of the coils. The transfer of heat from the coil to the sensor element is thereby improved, so that an improved temperature measurement of the electrical coil is obtained.

Thus, in the case of the inventive stator of an electrical machine, the temperature measurement is improved. The exemplary embodiments and/or exemplary methods of the present invention provide that the sensor carrier has a spring element that presses the sensor element against one of the coils.

Advantageous refinements of the stator described herein and improvements thereto are made possible by the measures delineated in the further descriptions herein.

It is particularly advantageous that the spring element have a strap-shaped configuration since, when a strap is used, a flat spring may be readily achieved that requires little space transversely to the longitudinal extension of the sensor carrier. Its flat configuration allows the sensor carrier to be easily inserted into the gap between the coils.

It is also advantageous that the strap of the spring element have two bearing surfaces for the sensor element since this allows the sensor element to be pressed selectively in terms of position against one of the coils.

It is also advantageous that the sensor carrier have at least one laterally cantilevered supporting element since this makes it possible to adjust a predefined position of the sensor carrier in the gap between two coils. Thus, the sensor element fastened to the sensor carrier is placed in a predefined position in the gap between the coils and thereby makes contact with one of the coils at a predetermined location. The at least one supporting element resiliently braces the sensor carrier against the coil facing away from the sensor element and counteracts the spring element.

Moreover, it is advantageous that the at least one supporting element have a strap-shaped configuration since, when a strap is used, a flat spring may be readily achieved that requires little space transversely to the longitudinal extension of the sensor carrier. Moreover, this makes it very simple to manufacture the supporting element.

In accordance with the exemplary embodiment, the sensor element of the temperature sensor is a negative temperature coefficient thermistor sensor element, respectively an NTC sensor element. Alternatively, a PTC sensor element may also be provided.

It is advantageous that the sensor carrier feature fastening arrangement for fastening at least one sensor cable running out from the sensor element, since this protects the sensor cable from damage when the sensor carrier is inserted into the gap between the coils. Moreover, the fastening arrangement provides a strain relief for the thin wire outlets of the sensor element should a tensile force be exerted from the outside onto the sensor cables.

Moreover, it is advantageous that the sensor carrier have a strip-shaped configuration since it is then readily insertable or introducible into the gap between the coils and requires little space. This substantially simplifies the assembly and disassembly of the temperature sensor.

A further advantage is attained when the sensor carrier is manufactured of plastic, insulating paper, insulating film or composite material. In the case of a variant using plastic, the spring elements, the supporting elements and the fastening elements may be realized on one level on the sensor carrier using injection molding. In the variant using paper, the sensor carrier may be readily stamped out and preformed together with the spring elements and the supporting elements. For this purpose, what is generally referred to as a hot-stamping or thermoforming may be used.

An exemplary embodiment of the present invention is shown in the drawing in simplified form and is explained in greater detail in the following description.

DETAILED DESCRIPTION

Figure 1:
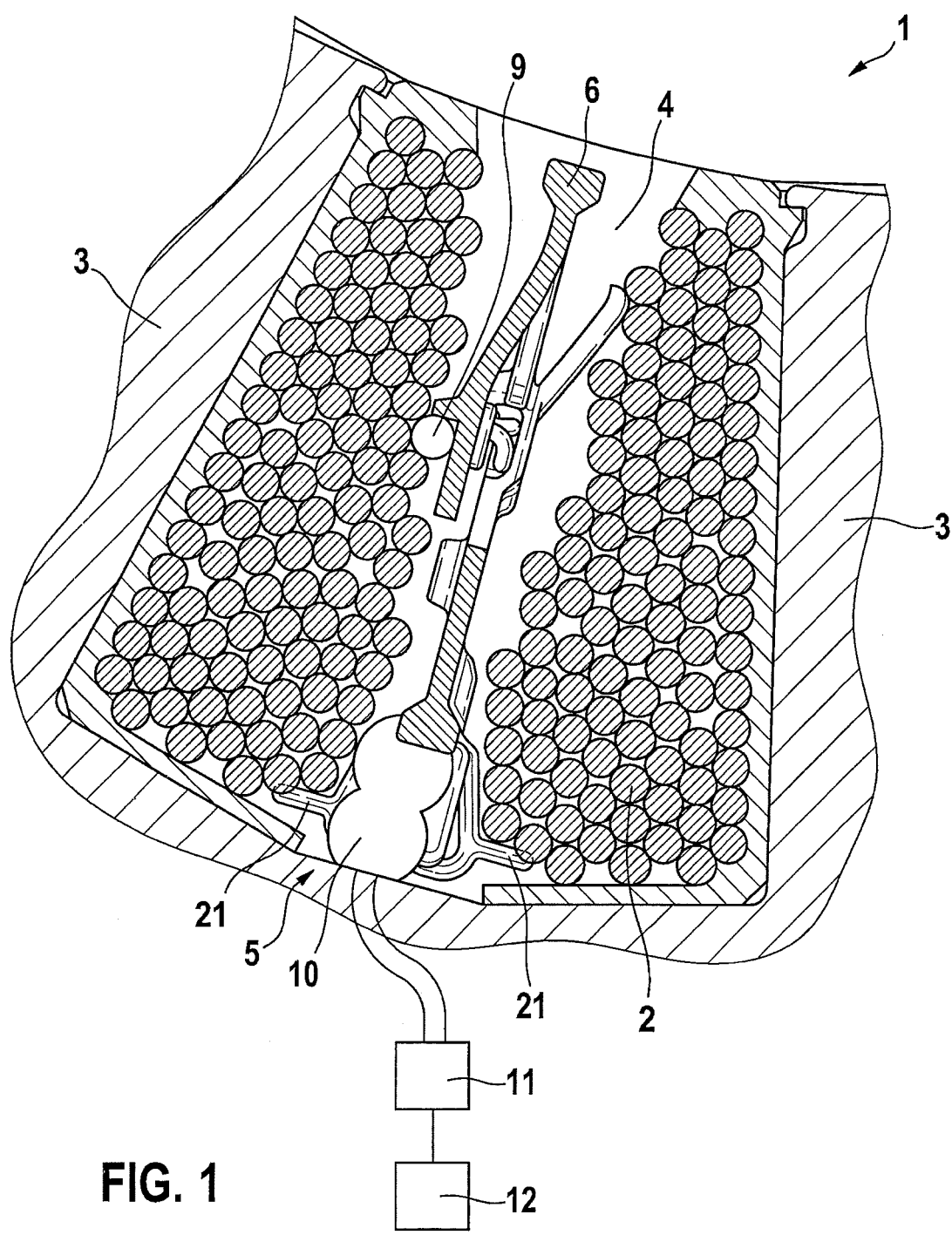
FIG. 1 shows a part sectional view of a stator of an electrical machine having a sensor carrier according to the present invention.

FIG. 1 shows a part sectional view of a stator of an electrical machine having a sensor carrier according to the exemplary embodiments and/or exemplary methods of the present invention.

Stator 1 is part of an electrical machine and has electrical coils 2 for generating a magnetic field. Stator 1 is composed of a laminated core and has a rim of teeth 3 between which interspaces, respectively slots 4 are formed. By the windings thereof, electrical coils 2 surround teeth 3 and at least partially fill slots 4. Electrical coils 2 have current flowing therethrough, and losses in the windings thereof result in an increased temperature in slots 4 and thus also in stator 1. Therefore, the heat loss arising in stator 1 is dissipated using known cooling methods. The temperature of the stator is monitored by a temperature sensor 5 to ensure that any imminent overheating of the electrical machine is recognized in time. Temperature sensor 5 is mounted in the region between electrical coils 2, thus in slots 4, since it is there that the highest temperatures occur. Temperature sensor 5 is provided on a sensor carrier 6 and is inserted or introduced, together with sensor carrier 6, into slots 4 following installation of electrical coils 2 on stator 1. Stator 1 is subsequently immersed in an impregnating resin. Once stator 1 is impregnated, temperature sensor 5 is anchored and fixed in place and thereby rendered vibration-resistant by the insertion of sensor carrier 6 and by the bonding provided by impregnating resin.

Temperature sensor 5 includes a sensor element 9. In accordance with the exemplary embodiment, sensor element 9 of temperature sensor 5 is what is generally known as a negative temperature coefficient thermistor sensor element, respectively what is generally referred to as an NTC sensor element, from which two sensor cables 8 lead to a power connector 11 that is connected to a control unit 12. Sensor element 9 is formed in a pearl shape, for example, but may have any other shape. Alternatively, sensor element 9 may also be configured as a PTC sensor element. In a section facing away from sensor element 9, sensor cables 8 are enclosed by a protective jacket 10.

Sensor element 9 transmits a value that corresponds to the temperature, for example, a resistance value, to control unit 12. Above a predefined threshold value, control unit 12 begins to step down the currents, and thus the power of the electrical machine to lower levels in order to protect the machine from overheating.

The exemplary embodiments and/or exemplary methods of the present invention provide that sensor carrier 6 have a spring element 15 that presses sensor element 9 elastically resiliently under a light pressure force against one of coils 2. This ensures that the actual temperature of electrical coil 2, and not a lower value, is measured. Sensor carrier 6 is dimensioned to allow sensor element 9 to make as close contact as possible with the hottest point of electrical coil 2.

Spring element 15 has strap-shaped configuration. Sensor carrier 6 features a recess 16, on whose one side, the strap of spring element 15 is provided. In the no-load state, the strap projects out of the plane of sensor carrier 6. For example, the strap of spring element 16 has a mount 17 for sensor element 9 into which sensor element 9 is loosely inserted. Mount 17 has two plane bearing surfaces, for example, which support sensor element 9 in two different directions. Alternatively, mount 17 may also be in the form of a spherical cap-shaped depression, for example, that partially accommodates and positions sensor element 9.

Moreover, sensor carrier 6 has at least one laterally cantilevered supporting element 20 that is elastically braced against coil 2 facing away from sensor element 9. As a result, a predetermined position of sensor carrier 6 in slot 4 between two coils 2 is adjusted in the circumferential direction of stator 1. Supporting elements 20 have a strap-shaped form, for example. The at least one supporting element 20 is cantilevered on the side facing away from spring element 15, both elements 15, 20 providing a spring loading action in opposite directions.

Radially relative to the axis of rotation of the electrical machine, the position of sensor carrier 6 is predetermined by positioning elements 21 that are configured on the sensor carrier, are disposed at right angles to the plane of the sensor carrier plane, and have a strap shape.

Moreover, a limit stop 19 may be provided that predetermines the axial position relative to the axis of rotation of the electrical machine in slot 4 between two coils 2. This ensures that sensor element 9 comes to rest in the hottest region (viewed in the axial direction). Limit stop 19 has a strap- or hook-type form, for example.

Moreover, fastening arrangement 22 for fastening or fixing sensor cables 8 are provided on sensor carrier 6, for example. Sensor cables 8 are inserted, introduced, clipped or clamped in between fastening arrangement 22, for example. Sensor carrier 6 has a strip-shaped configuration, for example, the at least one sensor cable 10 being routed in the direction of the longitudinal extent and in the plane of sensor carrier 6. Coming from connector 11, for example, sensor cables 8 run along the edge of the one long side 23 of sensor carrier 6. From the edge of sensor carrier 6, sensor cables 8 are routed inwardly via an arc-shaped cable channel 24 to recess 16 that includes spring element 15. Cable channel 24 is configured as a recess in sensor carrier 6, so that sensor cables 8 continue to run in the plane of sensor carrier 6 and are protected there from damage and compressive load. Fastening arrangement 22 is also provided in cable channel 24 that fix sensor cables 8 in place in cable channel 24 or at least guide the same. Sensor cables 8 are clipped or clamped in place in cable channel 24, for example. However, fastening arrangement 22 provided in cable channel 24 for sensor cables 8 may also be adhesive strips, adhesive agent or the like.

Sensor carrier 6 is made of plastic, for example. Alternatively, other electrically insulating materials are also possible that render possible an integrated spring function for spring element 15 and supporting elements 20, such as what is generally referred to as a rigid phase insulation paper or a rigid insulation film composed of a composite of paper and film, for example, that is also referred to as a composite material.

Figure 2:
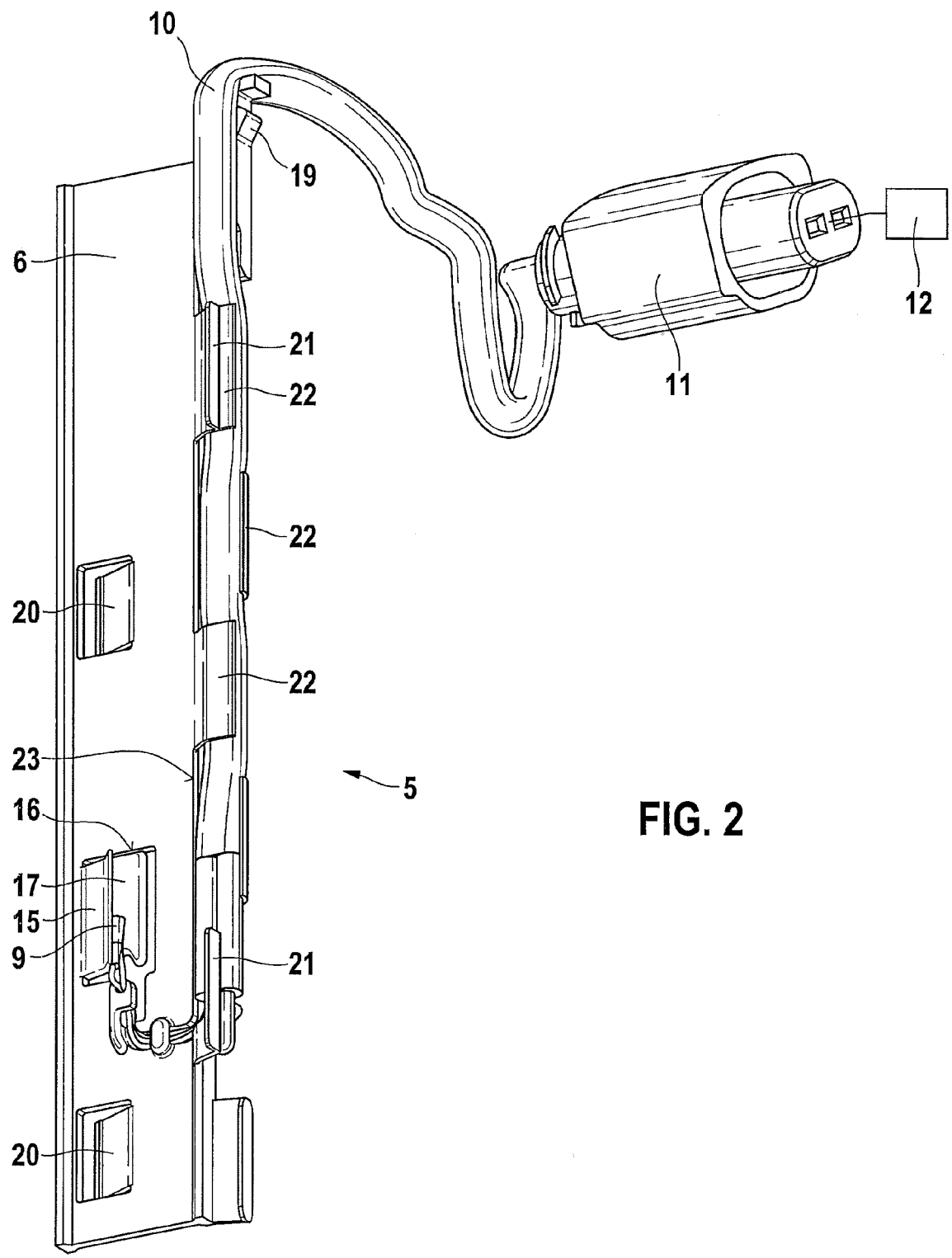
FIG. 2 shows a sensor carrier according to the present invention in accordance with FIG. 1.
Figure 3:
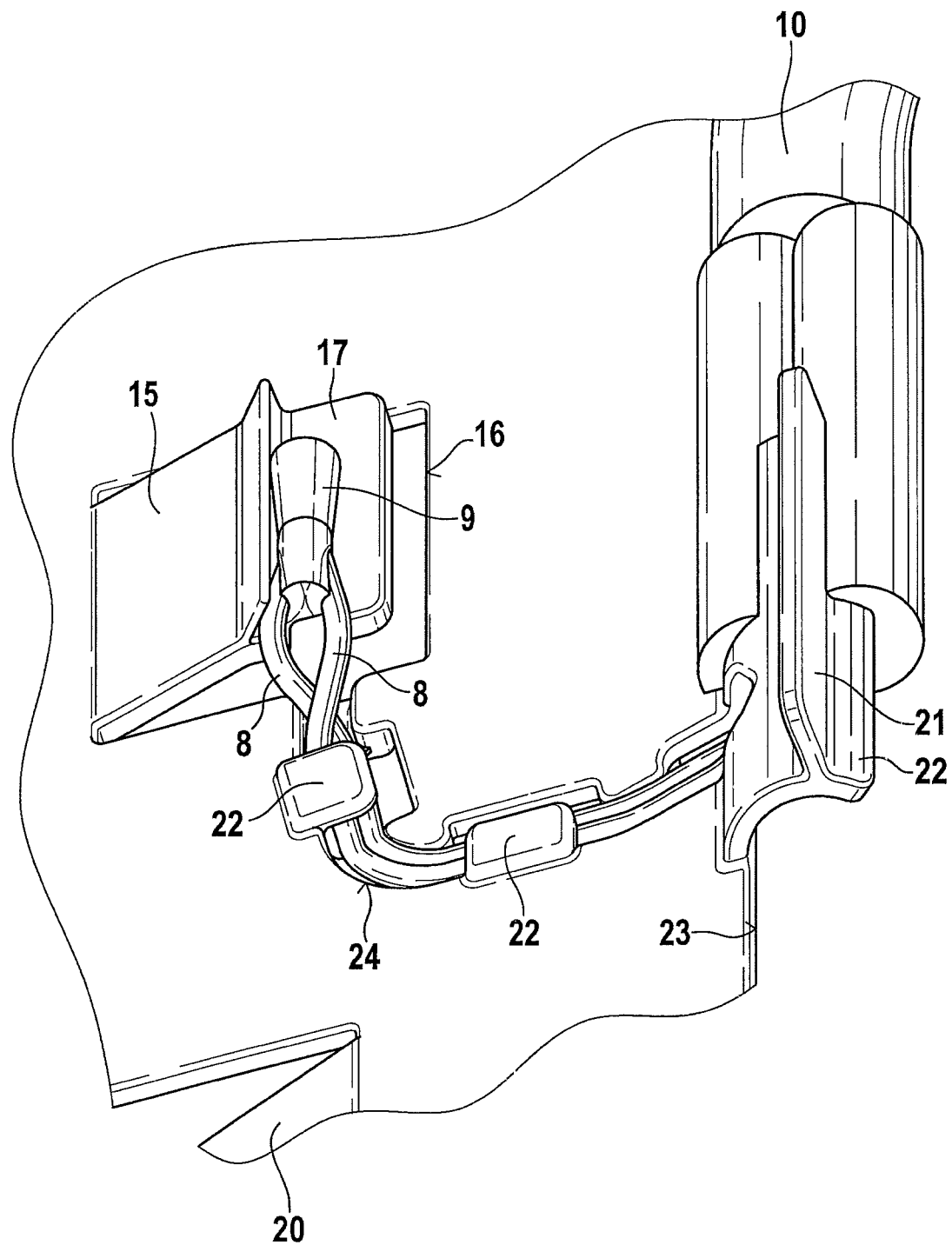
FIG. 3 shows a first partial view of the sensor carrier according to the present invention in accordance with FIGS. 1 and 2.
Figure 4:
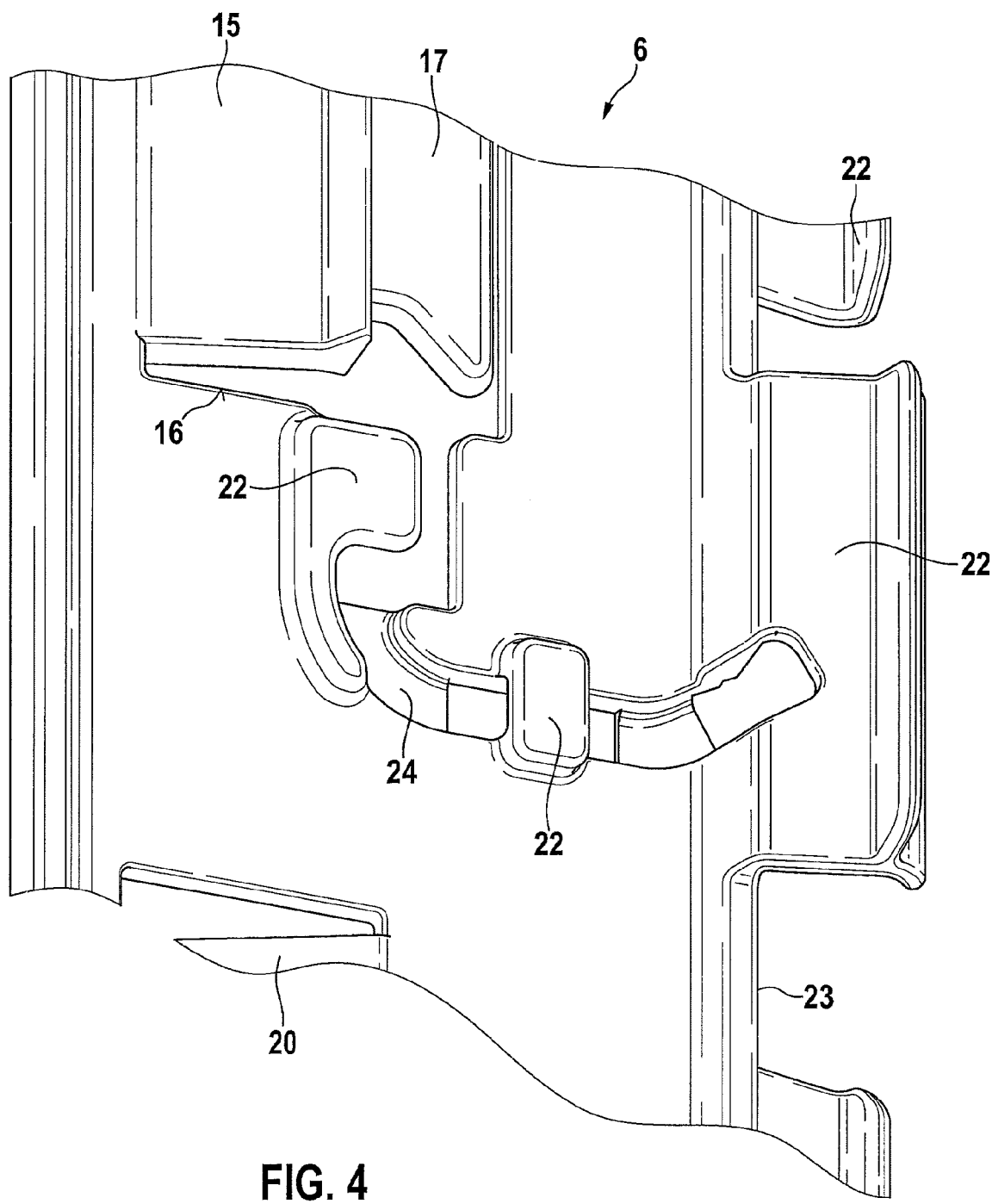
FIG. 4 shows a second partial view of the sensor carrier according to the present invention in accordance with FIG. 1 through 3.

In the case of the sensor carrier according to FIG. 2 through 4, parts equivalent to or performing functions equivalent to those in the view according to FIG. 1, are denoted by the same reference numerals.

What is claimed is:

1. A stator of an electrical machine, comprising:
   a plurality of electrical coils; and
   a temperature sensor for recording a temperature at one of the electrical coils, the temperature sensor being provided in the area between the coils on a sensor carrier and having a sensor element, wherein the sensor carrier has a spring element that presses the sensor element against one of the coils,
   wherein the spring element has a strap-shaped configuration,
   wherein the spring element has a mount for the sensor element, into which the sensor element is inserted, and
   wherein the sensor element of the temperature sensor is a negative temperature coefficient thermistor sensor element (an NTC sensor element) or a positive temperature coefficient thermistor sensor element (a PTC sensor element).

2. The stator of claim 1, wherein the sensor carrier has a strip-shaped configuration.

3. The stator of claim 1, wherein the sensor carrier is manufactured of a plastic, an insulating paper, an insulating film or a composite material.

\* \* \* \* \*